United States Patent
Fraioli, Sr.

[15] 3,693,780
[45] Sept. 26, 1972

[54] LATERAL-BEND ENDLESS CHAIN BELT CONVEYOR ASSEMBLY

[72] Inventor: Joseph Fraioli, Sr., 300 Martine Ave., White Plains, N.Y. 10601

[22] Filed: June 29, 1971

[21] Appl. No.: 157,992

[52] U.S. Cl. ................................................198/182
[51] Int. Cl. ............................................B65g 15/00
[58] Field of Search.....................198/181, 182, 195

[56] References Cited

UNITED STATES PATENTS

| | | | |
|---|---|---|---|
| 3,045,809 | 7/1962 | Bechtel | 198/195 |
| 3,494,456 | 2/1970 | Peterson | 198/195 |

*Primary Examiner*—Richard E. Aegerter
*Attorney*—Michael Ebert

[57] ABSTRACT

An endless chain belt conveyor assembly for transporting articles along an arcuate path. The assembly includes a trackway defined by concentrically-arranged curved inner and outer rails. Operating within the rails is an endless belt supported between a driven roll and an idler roll, the belt being constituted by a continuous train of inter-linked cross rods, the rods diverging one degree from each other so that the spacing between adjoining rods increases progressively from the inner rail ends of the rods to the outer rail ends thereof. Pivotally connected to the cross rods are several curved rows of slat-like links, the rows being concentrically arranged between the inner and outer rails to create a supporting surface extending across the rods. The first row of links, which lies adjacent the inner rail, is formed by links each bridging a respective pair of rods and having a tapered width to match the spacing between the rods joined thereby. The succeeding rows of links which extend toward the outer rail, are formed by links that are staggered with respect to those in the preceding row and are pivotally joined to alternate pairs of rods, the links in the succeeding rows having a tapered width to match the spacing between the rods joined thereby.

8 Claims, 8 Drawing Figures

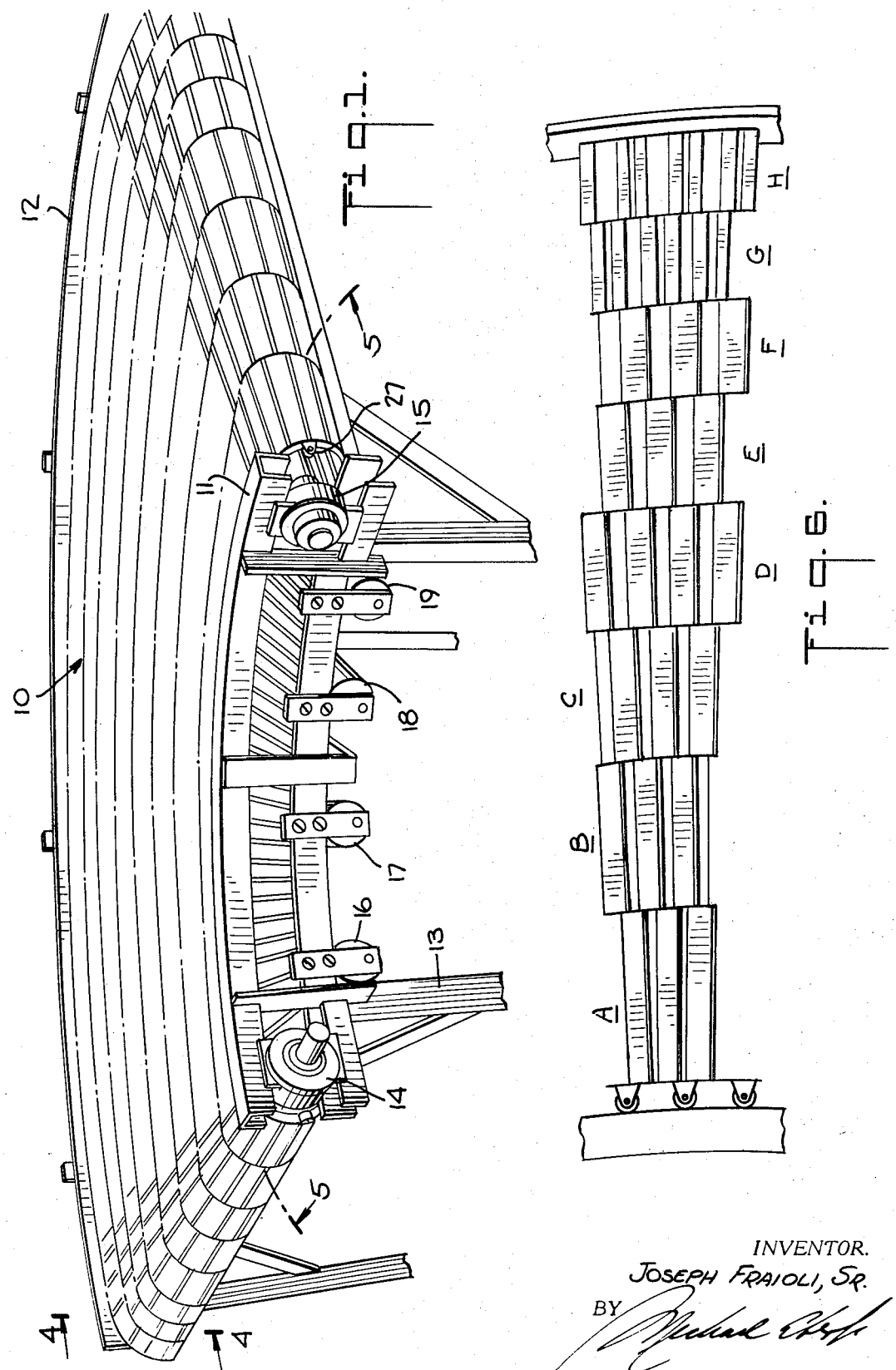

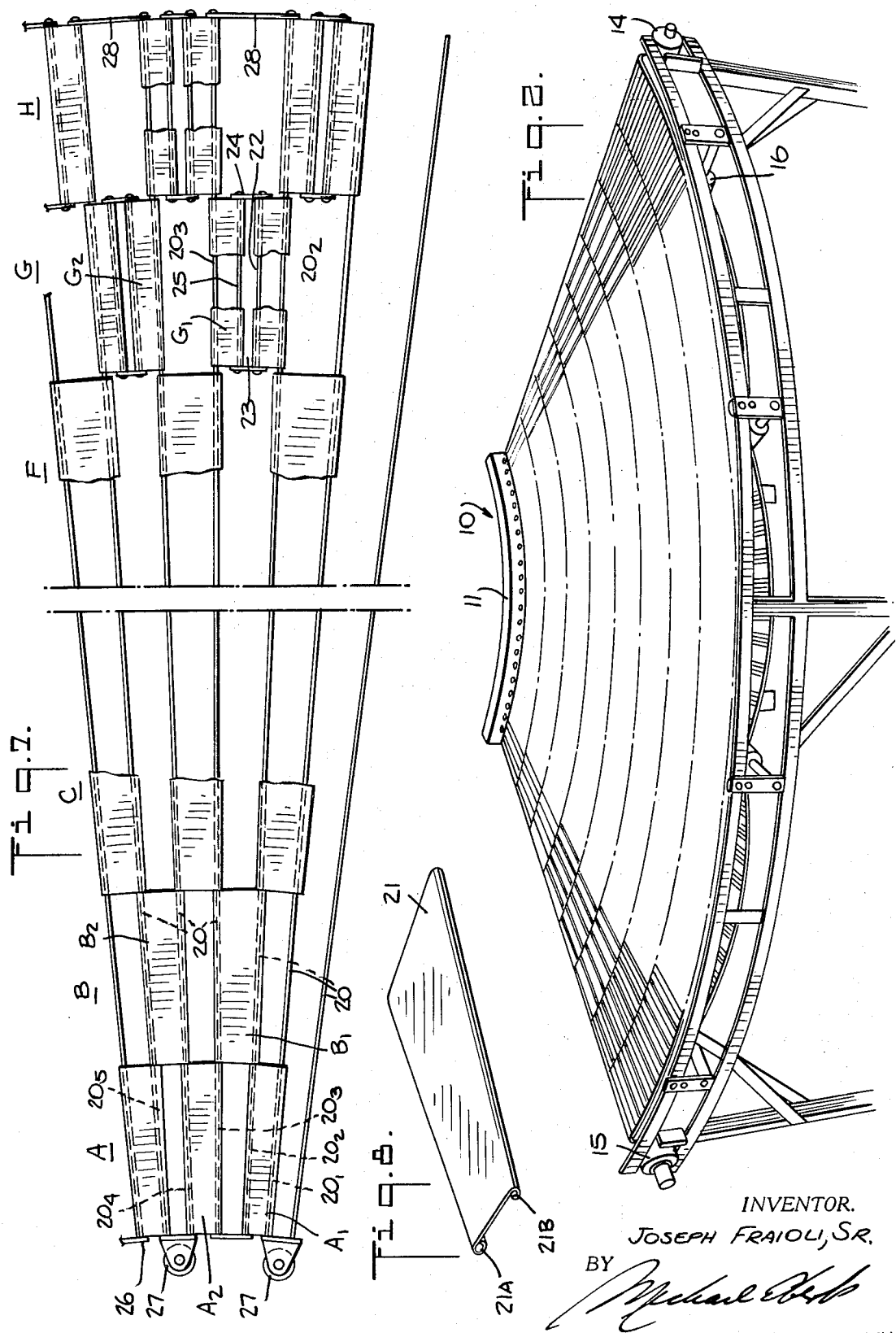

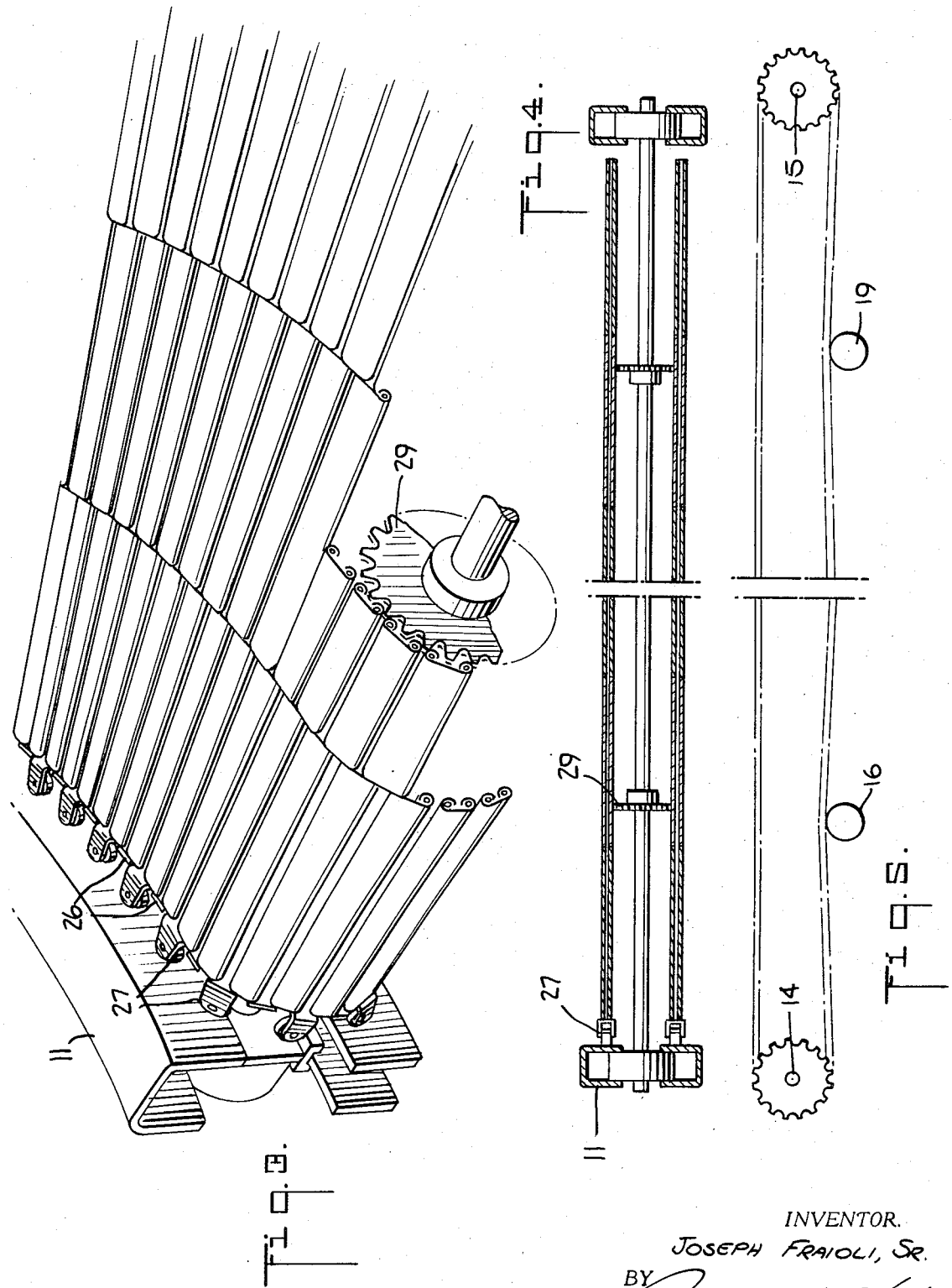

LATERAL-BEND ENDLESS CHAIN BELT CONVEYOR ASSEMBLY

BACKGROUND OF THE INVENTION

This invention relates generally to endless belt conveyor assemblies, and more particularly to an assembly including an endless chain belt adapted to transport articles in a curved path.

The conventional endless belt conveyor assembly, whether the belt is fabricated of flexible sheet material in metallic or fabric form, or is of mesh or link construction, is only capable of transporting articles in a straight path from an input to a discharge point. In many instances, it is desirable for the conveyor to change the direction of travel by making a lateral bend in the travel path in order, for example, to transport articles from the output of one work station to the input of a subsequent station whose position is laterally displaced from the first station.

Thus in some baking operations, products emerging from a baking oven must be conveyed in a right angle path to a packaging or processing machine, in which event a conveyor capable of making a 90° turn is required. In other instances, it is necessary to transport products in a reverse direction, in which event one must make a 180° turn.

Conveyor belt assemblies are commercially available which are capable of negotiating 90° and 180° turns, but such assemblies have numerous practical drawbacks, particularly in food handling operations.

In one such known belt assembly, the belt is made of links and rods covered by a woven wire mesh or grid. Though such belts are capable of making lateral turns, they inherently possess a high degree of friction and must be frequently lubricated. Where the belt serves to convey food products, the need for lubrication is objectionable, for the lubricant may contaminate the conveyed food products. Moreover, a grid or mesh belt is difficult to clean and maintain in a sanitary condition.

Also where the belt is inherently difficult to advance because its construction gives rise to frictional resistance, the belt, when driven, tends to vibrate or chatter, rather than to move smoothly and effortlessly, as a result of which the products conveyed thereby may be jostled. This may be injurious to delicate food products.

SUMMARY OF THE INVENTION

In view of the foregoing, it is the main object of this invention to provide an endless chain belt conveyor assembly adapted to efficiently transport articles in a curved path in order to negotiate right or left-hand turns.

More specifically, it is an object of this invention to provide a conveyor assembly of the above type of simple, inexpensive design, which operates with relatively little friction and whose links require no lubrication, whereby the conveyor assembly may be used to transport food products smoothly and without danger of contamination or jostling.

Also an object of the invention is to provide a conveyor assembly which offers free air circulation and may be readily and thoroughly cleaned to maintain high sanitary standards.

Briefly stated, these objects are accomplished by an endless chain belt conveyor assembly for transporting articles along an arcuate path, the assembly including a trackway defined by concentrically arranged curved inner and outer rails. Operating within the curved rails is an endless belt supported between a driven roll and an idler roll, the belt being constituted by a continuous train of interlinked cross rods, the rods diverging 1° from each other so that the spacing between adjoining rods increases progressively from the inner rail ends of the rods to the outer rail ends thereof.

Pivotally connected to the cross rods are several curved rows of slat-like links, which rows are concentrically arranged between the inner and outer rails to create a supporting surface extending across the rods. The first row of links which lie adjacent the inner rail, is formed by links each bridging a respective pair of rods and having a tapered width to match the spacing between the rods joined thereby. The succeeding rows of links which extend toward the outer rail, are formed by links which are staggered with respect to those in the preceding row and are pivotally joined to alternate pairs of rods, the links in the succeeding rows having a tapered width to match the spacing between the rods joined thereby.

OUTLINE OF THE DRAWING

For a better understanding of the invention as well as other objects and further features thereof, reference is made to the following detailed description to be read in conjunction with the accompanying drawing, wherein:

FIG. 1 is a perspective view of an endless chain lateral-bend conveyor belt embodying the principles underlying the invention, as seen looking toward the inner rail of the conveyor trackway;

FIG. 2 is a perspective view of the same conveyor, as seen looking toward the outer rail of the trackway;

FIG. 3 is an enlarged perspective view, partly cutaway, showing how the drive sprocket wheel engages the conveyor belt;

FIG. 4 is a transverse section taken in the plane indicated by lines 4—4 in FIG. 1;

FIG. 5 is a longitudinal section taken in the plane indicated by lines 5—5 in FIG. 1;

FIG. 6 is a plan view showing a portion of the conveyor chain belt structure;

FIG. 7 is an enlarged plan view of the portion of the chain belt structure showing the manner in which the links are connected to the cross rods;

FIG. 8 shows an individual link.

DESCRIPTION OF THE INVENTION

Referring now to FIGS. 1 and 2, there is shown an endless chain belt conveyor assembly in accordance with the invention, which is adapted to negotiate a 90° turn. It is to be understood, however, that a lateral-bend conveyor operating on essentially the same principle may be designed to negotiate other turns, such as 180°.

The conveyor assembly includes an endless chain belt generally designated by numeral 10, operating within an arcuate trackway defined by a curved inner rail 11 and a curved outer rail 12 concentric therewith. The trackway is supported on a frame 13. The chain belt extends between a driven roll 14 supported in suitable bearings at the output end of the conveyor and an idler roll 15 disposed at the input end thereof. The driven roll is operatively coupled by a pulley and belt system or other convention power linkage means, to a motor (not shown). The lower reach of the endless chain belt runs over a series of supporting rolls 16, 17, 18 and 19.

As best seen in FIGS. 6 and 7, the endless chain belt 10 is constituted by a continuous train of interlinked equi-spaced cross rods 20 which diverge 1° from each other, so that as one goes from the end of the rods adjacent the inner rail toward those adjacent the outer rail, the rods fan out and the spacing between adjoining rods increases progressively.

Pivotally connected to the cross rods are eight rows of slat-like links designated as rows A to H. In practice, one may use a greater or smaller number of rows, depending on how wide a belt is specified.

Each slat-like link in rows A to F, as shown by representative link 21 in FIG. 8, is formed by a piece of sheet metal or other material having a trapezoidal form, the long sides thereof being turned in to define tubular channels 21A and 21B for receiving the associated cross rods. The links in row A adjacent the inner rail of the trackway each bridge a respective pair of cross rods 20, and since the cross rods are divergent, the tapered width of the links in row A is made such as to match the spacing between rods joined thereby. Since each link in row A bridges a respective pair of rods in the train thereof, no link exists in row A between the trailing rod in one rod pair and the leading rod in the next rod pair in the train.

Thus in FIG. 7, it will be seen that link $A_1$ in row A bridges the pair of rods $20_1$ and $20_2$, and that link $A_2$ bridges the pair of rods $20_3$ and $20_4$, whereby rods $20_2$–$20$ and $20_4$–$20_5$ remain unbridged. However, the links in row B are staggered with respect to those in row A, so that link $B_1$ in row B bridges the pair of rods $20_2$ and $20_3$, while link $B_2$ bridges the pair of rods $20_4$ and $20_5$. Here again the width and taper of the links are such as to match the spacing between rods, and since the spacing between the rods increases progressively, the links in row B are broader than those in row A.

Similarly in row C, the links in this row are staggered with respect to those in row B, and their dimensions are such as to match the spacing between the cross rods bridged thereby. As one comes to the last two rows G and H, where the spacing between rods is relatively great, in order to maintain the flexibility of the belt the links in these rows are split into two sections which are hinged together.

Thus link $G_1$ is formed by two sections. One section is pivotally connected at one edge to cross rod 20A and at the other edge to a pin 22 whose ends are pivotally linked by connectors 23 and 24 to a similar pin 25 held in one edge of the second section of the link, the other edge thereof being joined to cross rod $20_3$. Link $G_2$ as well as the other links in row G are similarly constructed. The same double section link arrangement is found in row H, so that as these links pass over the rolls of the conveyor, the link sections fold to facilitate passage thereover.

As best seen in FIG. 3, the ends of cross rods 20 adjacent inner rail 11 are pivotally interconnected by connectors 26, alternative connectors being provided with casters 27 which engage the surface of the inner rail, thereby reducing friction at the point of greatest wear, for as the conveyor belt advances in a curved path, it applies a relatively heavy pressure against the inner rail, whereas little if any pressure is imposed on the outer rail. The ends of the rods adjacent the outer rail (see FIG. 7) are pivotally interconnected by connectors 28.

Drive roll 14, as best seen in FIGS. 3 and 4 is provided with sprocket wheels 29 whose teeth fall into the spaces between the cross rods intermediate the rows of links, thereby advancing the chain belt as the drive roll rotates. Because of the spacing between links, air is free to circulate. Also the arrangement lends itself to easy and thorough cleaning, for all surfaces are exposed and there are no intermeshing wires which resist cleaning.

While there has been shown and described a preferred embodiment of a lateral-bend endless chain belt conveyor assembly in accordance with the invention, it will be appreciated that many changes and modifications may be made therein without, however, departing from the essential spirit of the invention.

I claim:

1. An endless chain belt conveyor assembly for transporting articles along an arcuate path, said assembly comprising:

A. a trackway having an input and output defined by concentrically-arranged curved inner and outer rails;

B. an endless chain belt operating within said trackway, said belt including a continuous train of interlinked cross rods which diverge one degree from each other, whereby the spacing between adjoining rods increases progressively from the ends thereof adjacent the inner rail to the ends thereof adjacent the outer rail, a plurality of slat-like links pivotally interconnecting said rods, said links being arrayed in a pattern defined by concentrically arranged curved rows to create a supporting surface extending across the rods, the first row of links lying adjacent the inner rail and being formed by links each of which bridges a respective pair of rods in the train and has a tapered width to match the spacing between the rods joined thereby, the links in the succeeding rows being staggered with respect to those in the preceding row and being pivotally joined to alternate pairs of rods in the train, the links in the succeeding rows having a tapered width to match the spacing between the rods joined thereby, and C. rolls disposed at the input and output of said trackway to support said belt.

2. An assembly as set forth in claim 1, wherein said rolls are provided with sprocket wheels whose teeth extend into the space between adjoining rods.

3. An assembly as set forth in claim 2 further including power means to rotate one of said rolls to advance said belt.

4. An assembly as set forth in claim 1, wherein said trackway defines a 90° bend.

5. An assembly as set forth in claim 1, wherein said trackway defines a 180° bend.

6. An assembly as set forth in claim 1, wherein each link in the row adjacent the inner rail is defined by a metallic sheet whose long sides are turned in to define channels for receiving the associated rods.

7. An assembly as set forth in claim 1, wherein each link in the row adjacent the outer rail is defined by two sections of metal which are pivotally interconnected, whereby the sectioned link folds when passing over said rolls.

8. An assembly as set forth in claim 1 further including casters joined to the ends of the rods adjacent the inner rail and riding in said inner rail.

* * * * *